United States Patent [19]
Kwang-Chien

[11] Patent Number: 5,517,211
[45] Date of Patent: May 14, 1996

[54] OPTICAL SIGNAL DETECTOR FOR AN ELECTRO-OPTICAL MOUSE

[76] Inventor: Fong Kwang-Chien, No.7-1, Alley 30, Lane 318, Sec.1 Chung Yang Rd., Tu Cheng, Taipei Hsien, Taiwan

[21] Appl. No.: 140,335

[22] Filed: Oct. 21, 1993

Related U.S. Application Data

[63] Continuation of Ser. No. 882,800, May 14, 1992, abandoned.

[51] Int. Cl.$^6$ ..................................................... G09G 5/08
[52] U.S. Cl. ............................................ 345/166; 359/668
[58] Field of Search .................... 340/710; 250/221; 359/668; 345/163, 166; 178/18; 33/1 M

[56] References Cited

U.S. PATENT DOCUMENTS 5,075,541 12/1991 Chien ................................. 340/710 X
5,086,197 2/1992 Liou .................................... 340/710 X
5,115,334 5/1992 Tomita ............................... 359/668 X

FOREIGN PATENT DOCUMENTS 0146843 7/1985 European Pat. Off. ............... 340/710

*Primary Examiner*—Richard Hjerpe
*Assistant Examiner*—Kara Farnandez Stoll
*Attorney, Agent, or Firm*—Beveridge, DeGrandi, Weilacher & Young

[57] ABSTRACT

An optical signal detector for an electro-optical mouse comprising elliptical lenses for X-axis and Y-axis to longitudinally latitudinally magnify X-axis and Y-axis images taken on a grating work pad, permitting longitudinal magnification to be greater than latitudinal magnification. Receivers respectively receive magnified X-axis and Y-axis images so as to provide signals indicative of the direction and amount of movement of the optical signal detector for moving the visible cursor from position to position on a display screen.

2 Claims, 6 Drawing Sheets

OPTICAL SIGNAL DETECTOR FOR AN ELECTRO-OPTICAL MOUSE

This application is a continuation of application Ser. No. 07/882,800 filed May 14, 1992, now abandoned.

BACKGROUND OF THE INVENTION

The present invention relates to optical signal detector, and relates more particularly to a dual-beam detector for an electro-optical mouse.

A variety of functional control devices are known and widely used in controlling a display cursor. These devices have taken several forms. They can be gathered into two categories basically: a mechanical type, or an optical type. A mechanical cursor control device is generally comprised of a ball controlled to move on a work pad. An output indicative of the direction and amount of movement of the cursor control device is produced and employed to move the cursor on a display screen. This structure of mechanical cursor control device is not very reliable, particularly over long periods of use. An optical cursor control device, or an electro-optical mouse, is generally comprised of a lens used to magnify the images taken on a work pad relative to the direction and amount of movement of the cursor control device, permitting the magnified images to be reflected onto a receiver by a reflector, which receiver converts the images into electronic signals indicative of the direction of movement of the cursor control device, for moving the cursor from position to position on a display screen. In order to differentiate the images for the X-axis from the images for the Y-axis, the work pad may be made in two colors so that a special photo sensor can detect X-axis signals from Y-axis signals. However, this arrangement greatly increases the cost of the cursor control device. There is an alternate method used to detect X-axis signals from Y-axis signal. This alternate method is to assign the top edge of the work pad for the X direction and the bottom edge thereof for the Y-direction. This arrangement increases the total thickness of the work pad and reduces the reliability of tracking.

In order to eliminate the aforesaid disadvantages, there is provided an electro-optical cursor control device which utilizes a cylindrical lens to magnify images longitudinally. This arrangement improves the reliability. However, the optical cursor control device should be kept in course while tacking on a work pad. Any minor deviation may affect the reliability of the cursor control device. As illustrated in FIGS. 8 and 9, distortion occurred to the magnified lines that were imaged while the cursor control device biased from course.

SUMMARY OF THE INVENTION

The present invention has been under the aforesaid circumstances. According to the preferred embodiment of the present invention, an optical signal detector is generally comprised of an X-axis optical signal detecting devices and a Y-axis optical signal detecting device, of which each comprising a LED light source to emit light onto a grating work pad, an elliptical lens to magnify the image reflected by the grating work pad, a reflector to reflect the image magnified through the elliptical lens, and a receiver to receive the image reflected by the reflector, wherein changes in images corresponding to the movement of the X-axis and Y-axis optical signal detecting devices on the grating work pad are respectively detected by the reflector and treated to move the visible cursor from position to position on a display screen. The elliptical lens is to magnify the image passed therethrough longitudinally latitudinally permitting longitudinal magnification to be greater than latitudinal magnification.

DETAILED DESCRIPTION OF THE PREFERRED EMBODIMENT

Figure 1:
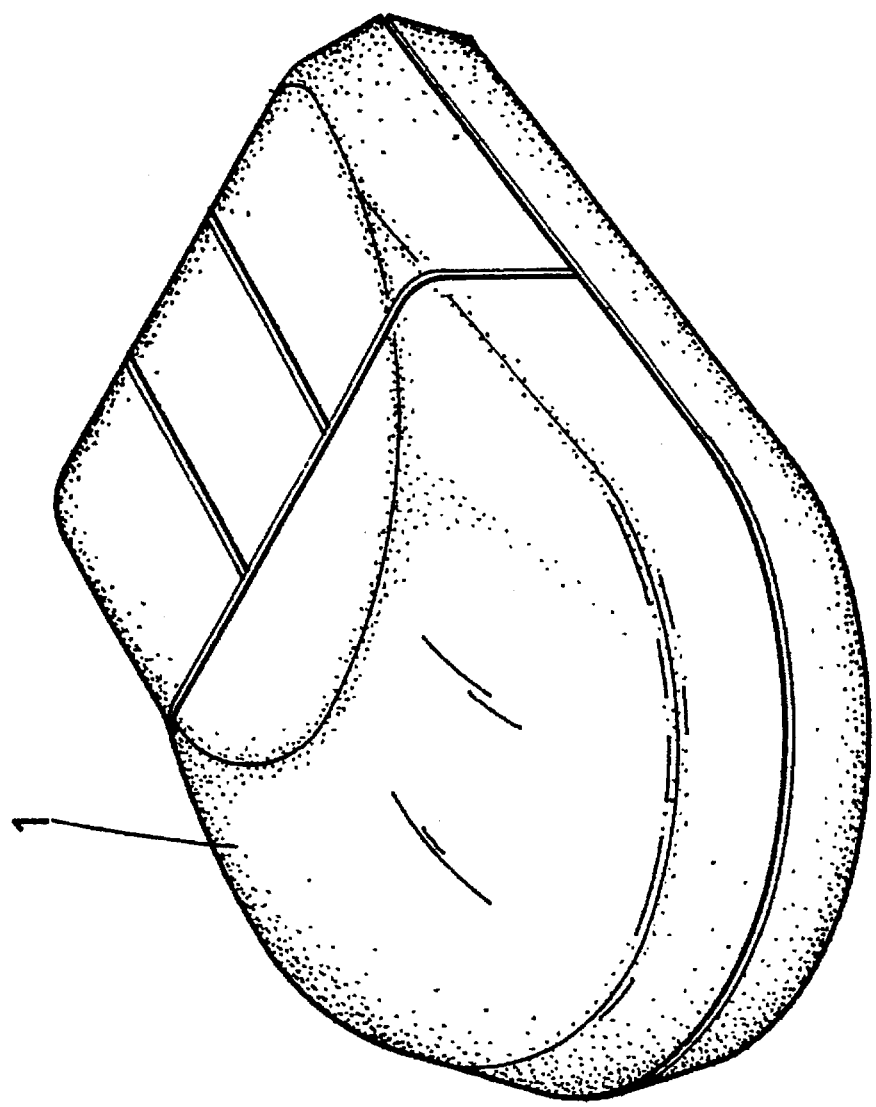
FIG. 1 is an elevational view of an electro-optical mouse embodying the present invention.
Figure 2:
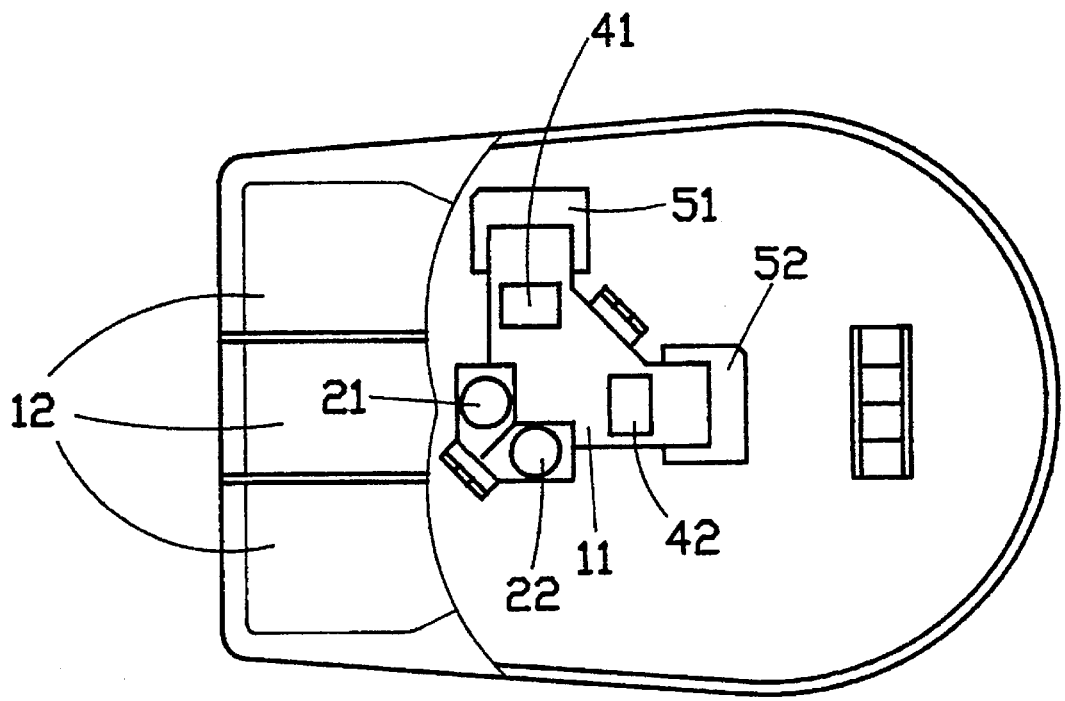
FIG. 2 is a top view showing the internal structure of the electro-optical mouse.
Figure 3:
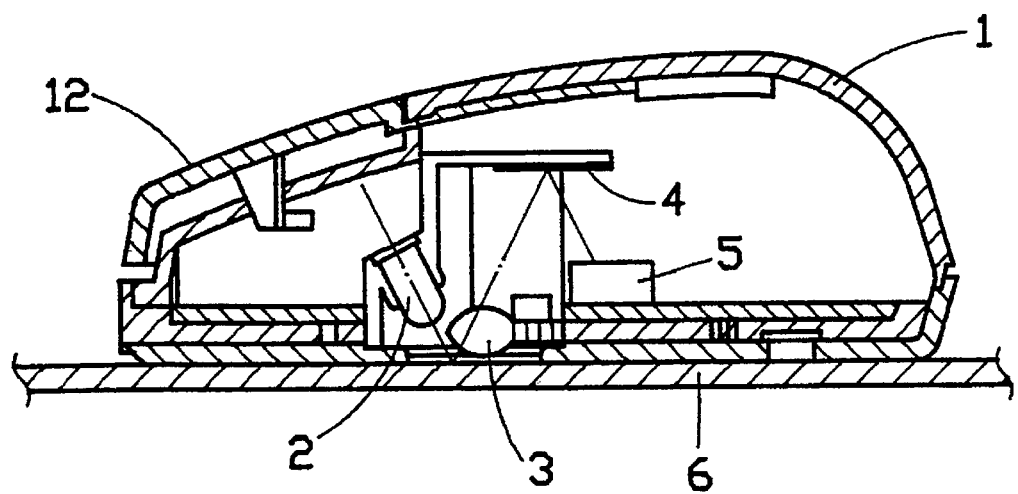
FIG. 3 is a front view showing the internal structure of the electro-optical mouse.
Figure 4:
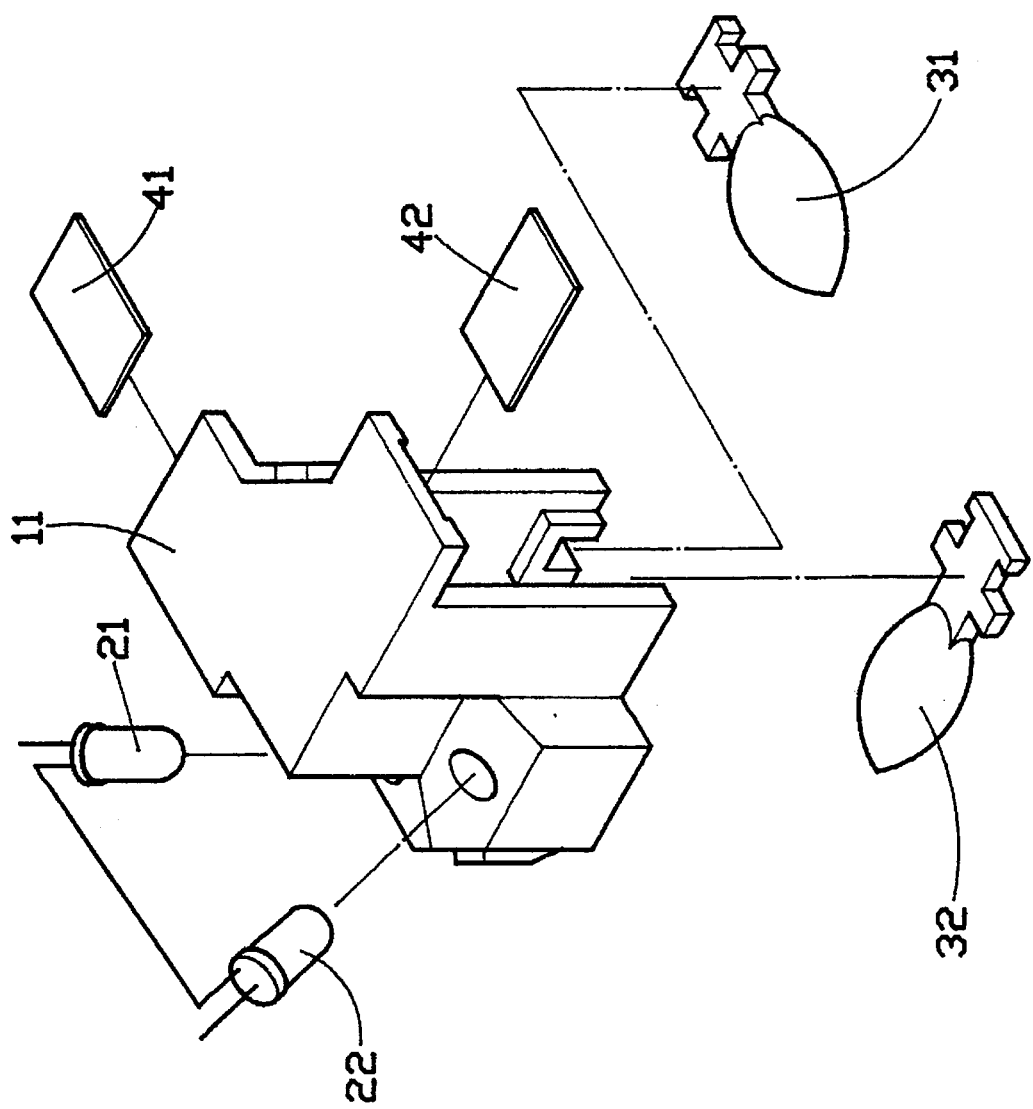
FIG. 4 is an exploded view of the mount, the light source, the lens assembly and the reflector assembly.
Figure 5:
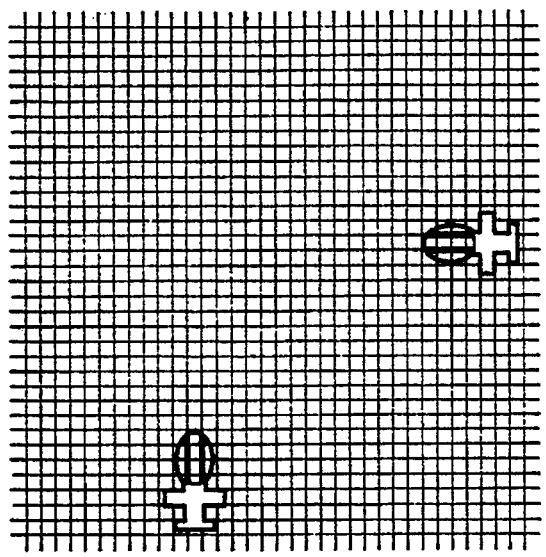
FIG. 5 illustrates an image taken on X-axis and Y-axis over the work pad, by the electro-optical mouse of the present invention, in an enlarged scale.
Figure 6:
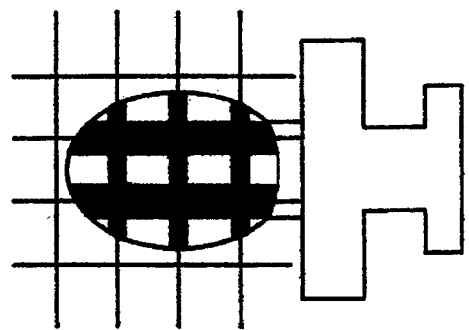
FIG. 6 illustrates an image taken on Y-axis over the work pad, by the electro-optical mouse of the present invention, in an enlarged scale.
Figure 7:
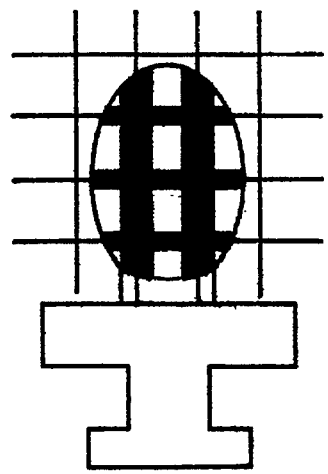
FIG. 7 illustrates an image taken on X-axis over the work pad, by the electro-optical mouse of the present invention, in an enlarged scale.
Figure 9:
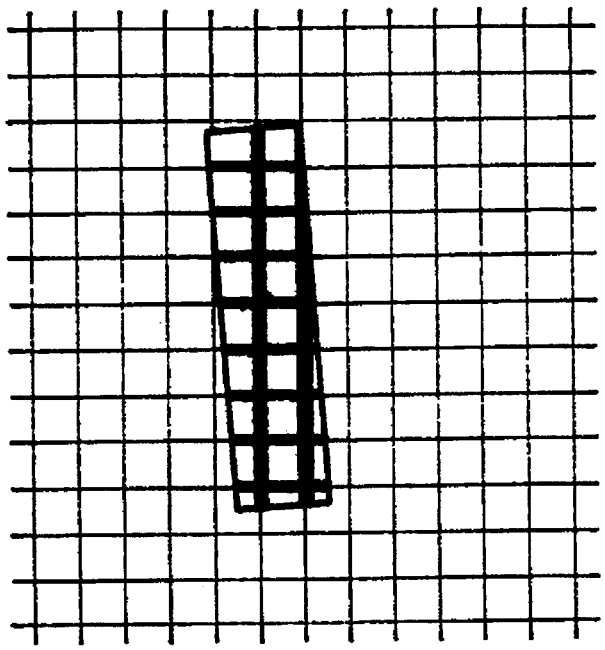
FIG. 9 illustrates a biased image taken on X-axis and Y-axis over a work pad by a prior art mouse, in an enlarged scale.
Figure 8:
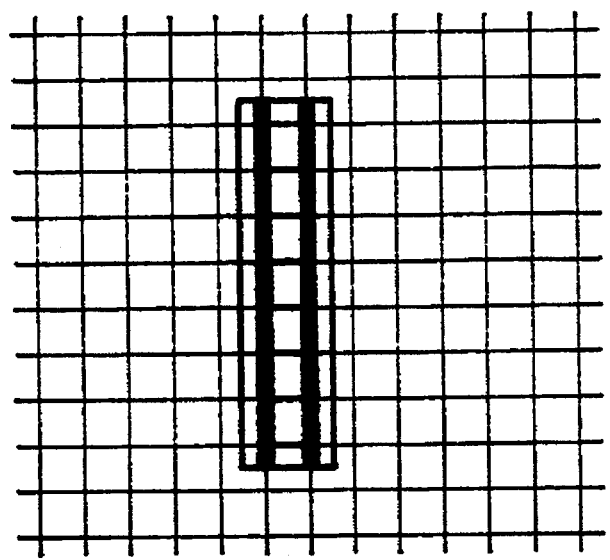
FIG. 8 illustrates an image taken on X-axis and Y-axis over a work pad by a prior art mouse, in an enlarged scale.
Figure 10:
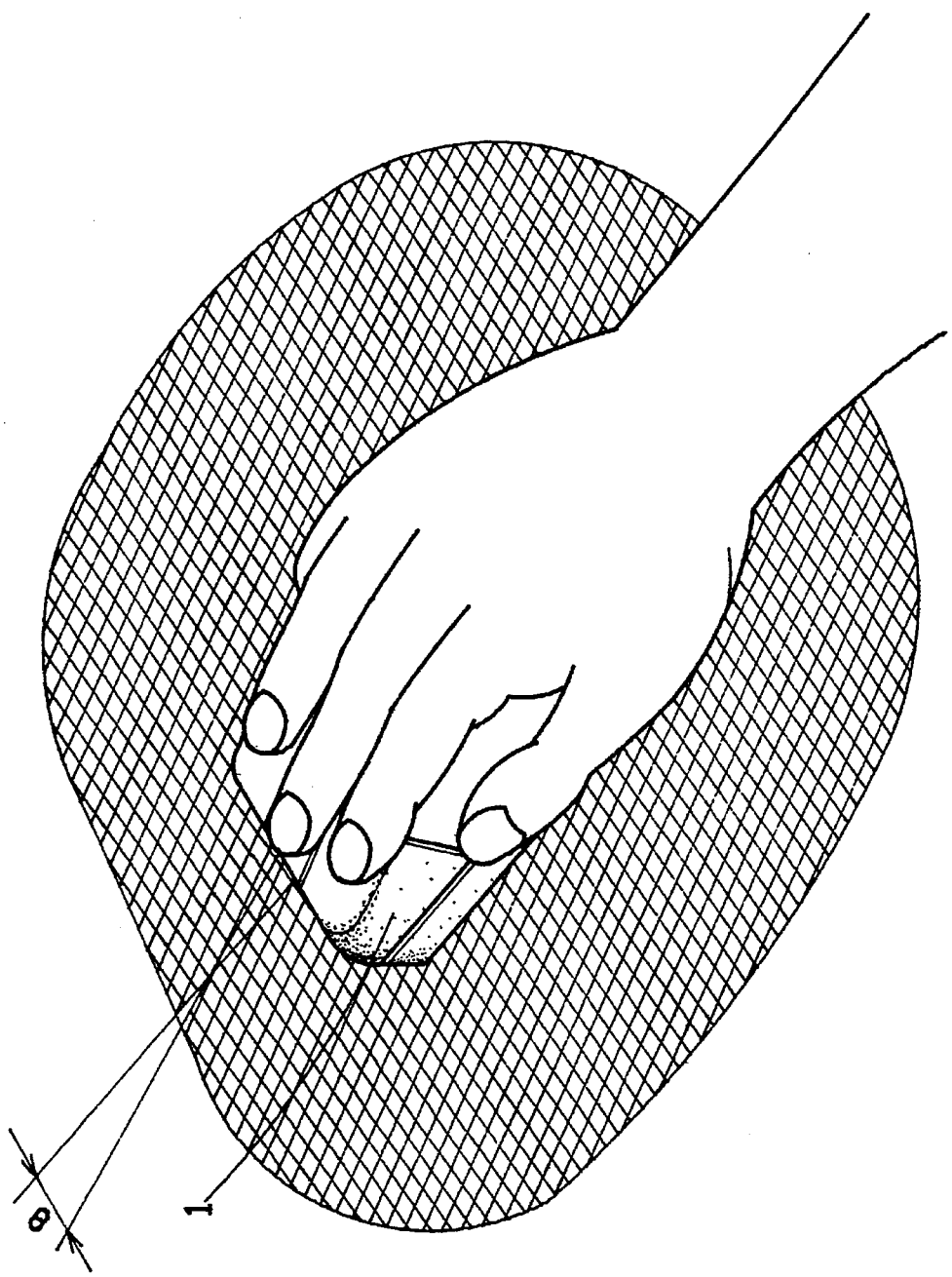
FIG. 10 illustrates a prior art mouse on a work pad biased to produce the image of FIG. 9.

Referring to FIGS. 1, 2, 3 and 4, the preferred embodiment of the optical signal detector, namely, the electro-optical mouse of the present invention is generally comprised of a housing 1, a light source 2, a lens assembly 3, a reflector assembly 4, and a receiver assembly 5. The housing 1 comprises a mount 11 on the inside, onto which component parts are mounted, and a plurality of function keys 12 on the outside at the top. The light source 2 is consisted of two light emitting diodes, namely, a first LED 21 and a second LED 22 respectively mounted on the mount 11 to emit light onto a work pad 6, permitting the light of the LEDs 21,22 to be reflected by the work pad 6 into a stable light beam respectively. The lens assembly 3 is consisted of two elliptical lenses, namely, the X-axis lens 31 for the X direction and the Y-axis lens 32 for the Y direction respectively mounted on the mount 11 at lower locations. Light beams reflected by the work pad 6 in the X and Y directions are respectively magnified through the X-axis lens 31 and the Y-axis lens 32. The lines of the image that pass through either lens 31 or 32 in parallel with the major axis thereof are relatively greatly magnified over the lines of the image that pass through either lens 31 or 32 in parallel with the minor axis thereof (see FIGS. 6 and 7). The reflector assembly 4 is mounted on the mount 11 at the top, consisted of an X-axis reflector 41 and a Y-axis reflector 42, and used to reflect the light beams magnified through the lens assembly 3. The receiver assembly 5 is consisted of an X-axis receiver 51 and a Y-axis receiver 52 to detect the the light beams reflected by the X-axis reflector 41 and the Y-axis reflector 42 respectively. Moving the mouse on the work pad causes image changes in the X and Y directions, which are continuously respectively detected by the X-axis receiver 51 and the Y-axis receiver 52. An output indicative of the direction and amount of movement of the mouse is produced, after the detected signals from the X-axis receiver 51 and the Y-axis receiver 52 having been processed through a logic circuit, and employed to move the visible cursor from position to position on a display screen.

The main feature of the present invention is at the elliptical lenses 31,32 which magnify light beams longitudinally latitudinally at different grades. The lines of the image that pass through either lens 31 or 32 in parallel with the major axis thereof are relatively greatly magnified over the lines of the image that pass through either lens 31 or 32 in parallel with the minor axis thereof. The lines in parallel with the major axis will be magnified at 1.3 times over the lines in parallel with the minor axis. This special arrangement ensures more accurate tracking indicative of direction of movement and the amount of that movement even if the mouse biased from course within a tolerable range.

What is claimed is:

1. In a combination of an electro-optical mouse and a reflecting grating on a work pad whereby movement of said mouse on said work pad will be translated into movement of a cursor on a display screen, the improvement comprising:

a dual beam signal detector for said mouse comprising an X-axis optical signal detector and a Y-axis optical signal detector, each of said signal detectors comprising LED light source means emitting a light signal onto said pad in the respective axis direction and producing an image reflected therefrom, elliptical lens means for receiving said reflected image and magnifying the image thereof in a longitudinal and in a latitudinal direction with the longitudinal direction being of greater magnification than that of the latitudinal direction, reflector means for reflecting the image magnified by said lens means and receiver means for receiving the image reflected from said reflector means.

2. The optical signal detector according to claim 1, wherein said longitudinal magnification is about 1.3 times over said latitudinal magnification.

* * * * *